(12) United States Patent
Schubert et al.

(10) Patent No.: US 8,009,354 B2
(45) Date of Patent: Aug. 30, 2011

(54) FRESNEL LENS AND PROJECTION DISPLAY DEVICE USING ONE SUCH LENS

(75) Inventors: Arno Schubert, Chevaigne (FR); Pascal Benoit, Liffre (FR)

(73) Assignee: Thomson Licensing, Boulogne (FR)

( * ) Notice: Subject to any disclaimer, the term of this patent is extended or adjusted under 35 U.S.C. 154(b) by 701 days.

(21) Appl. No.: 10/585,652

(22) PCT Filed: Jan. 7, 2005

(86) PCT No.: PCT/EP2005/050051
§ 371 (c)(1),
(2), (4) Date: Apr. 29, 2009

(87) PCT Pub. No.: WO2005/071446
PCT Pub. Date: Aug. 4, 2005

(65) Prior Publication Data
US 2009/0296211 A1 Dec. 3, 2009

(51) Int. Cl.
*G03B 21/56* (2006.01)
*G02B 3/08* (2006.01)
(52) U.S. Cl. ........................................ 359/460; 359/742
(58) Field of Classification Search .................. 359/460, 359/457, 742–743
See application file for complete search history.

(56) References Cited

U.S. PATENT DOCUMENTS

| 4,452,509 | A | * | 6/1984 | VanBreemen | 359/457 |
| 5,477,380 | A | * | 12/1995 | Watanabe et al. | 359/457 |
| 5,577,492 | A | | 11/1996 | Parkyn, Jr. et al. | |
| 6,046,847 | A | * | 4/2000 | Takahashi | 359/457 |
| 7,102,820 | B2 | * | 9/2006 | Peterson et al. | 359/457 |
| 7,342,728 | B2 | * | 3/2008 | Schubert et al. | 359/742 |

FOREIGN PATENT DOCUMENTS

EP 0629899 12/1994
JP 2002-221605 8/2002

OTHER PUBLICATIONS

Patent Abstracts of Japan, vol. 2002, No. 12, Dec. 12, 2002 & JP 2002-221605 Search Report Dated Mar. 7, 2005.

* cited by examiner

*Primary Examiner* — Christopher Mahoney
(74) *Attorney, Agent, or Firm* — Robert D. Shedd; Patricia A. Verlangieri

(57) ABSTRACT

A Fresnel lens comprises at least one first prism and one second prism. Each prism has a first side and a second side which forms with a main axis an angle greater than that formed by the first side and the main axis. Conventionally, the second side of the first prism collimates the light received from a light source in line with the main axis. In order to improve the optical effectiveness, the second side of the second prism transmits the light received from the source in a first direction slightly different from the main axis.

11 Claims, 3 Drawing Sheets

FRESNEL LENS AND PROJECTION DISPLAY DEVICE USING ONE SUCH LENS

This application claims the benefit, under 35 U.S.C. §365 of International Application PCT/EP05/050051, filed Jan. 7, 2005, which was published in accordance with PCT Article 21(2) on Aug. 4, 2005 in French and which claims the benefit of French patent application No. 0450024, filed Jan. 7, 2004.

1. FIELD OF THE INVENTION

The invention relates to a Fresnel lens and a projection display device using such a lens.

2. TECHNICAL BACKGROUND

The use in optical technology of a Fresnel lens to obtain a general collimation effect with a reduced lens thickness is known.

A lens of this type is, for example, disclosed in the patent application published as JP 2002-221 605. This lens collimates the incident ray sent by a light source. To do this, the lens comprises prismatic elements that rectify the rays received from the source into a beam of parallel rays.

This lens is, for example, used in a projection display device. In practice, in such a device, a small imager is project onto a display screen by a projection system, with angles of incidence on the screen that extend over a determined range of values, for example from 30° to 60°.

The flow received from the projection system must therefore be globally collimated by a Fresnel lens, that is, rectified in a horizontal direction, before being generally micro-focused through a dark matrix then diffused in the desired observation field.

According to JP 2002-221 605, the design of the lens is such that the prismatic elements which receive the rays with a low angle of incidence work in refraction mode whereas those that receive rays with a high angle of incidence work in reflection mode.

The result is good efficiency in the region of the high angles of incidence and in the region of the low angles of incidence. In the intermediate region, however, the efficiency remains mediocre regardless of the type of prism used.

3. SUMMARY OF THE INVENTION

In order in particular to resolve this problem, the invention proposes a Fresnel lens comprising at least one first prism and one second prism, each prism having a first side and a second side which forms with a main axis an angle greater than that formed by the first side and the main axis, the second side of the first prism being designed to collimate the light received from a light source in line with the main axis, in which the second side of the second prism is designed to transmit the light received from the source in a first direction different from the main axis.

Thus, by accepting the decollimation of the rays transmitted (that is, reflected or refracted) by the second side of the second prism, the orientation of this side can be adjusted to obtain a better optical effectiveness, i.e. a better efficiency.

At the boundary between two areas, each having an above type of prism, the first prism is adjacent to the second prism.

According to a preferred embodiment, the first direction is divergent from the main axis.

That enables to obtain an effect of the necessary amplitude.

Generally, the first direction and the main axis form between them an angle greater than 1°, preferably greater than 2°, and less than 10°, preferably less than 5°.

The first and the second prisms can work either in reflection mode or in refraction mode. The reflective or transmissive transmission mode for the first and second prisms can be the same or different. In the latter case, it is possible to provide for a third prism to be designed to reflect the light received from the source in line with the main axis; it is also possible in this case to provide for at least one fourth prism to be designed to reflect the light received from the source in a second direction different from the main axis. More generally, it is possible to provide two, three or four prisms, each being designed to reflect or refract the light received.

The invention is particularly advantageous in the context of a projection display device. Also therefore proposed is a projection display device comprising means of generating an image, means of projecting the image onto a screen which comprises a Fresnel lens according to the invention and optical focus and/or diffusion elements.

4. LIST OF FIGURES

Other features of the invention will become apparent in light of the description that follows, given with reference to the appended drawings in which.

5. DETAILED DESCRIPTION OF THE INVENTION

Figure 1:
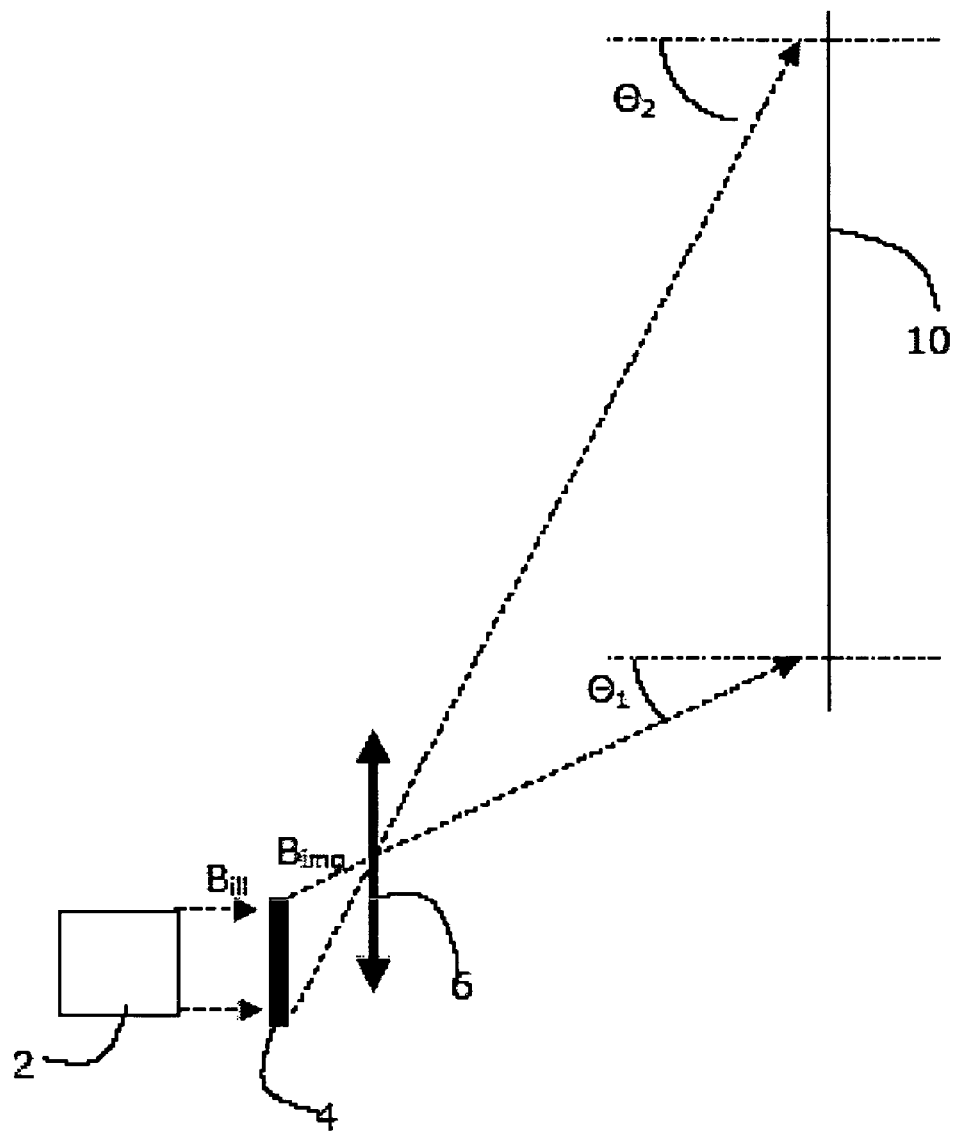
FIG. 1 represents an exemplary display device to which the invention applies.

The display device diagrammatically represented in FIG. 1 comprises a lighting system 2 which generates a binary light beam $B_{ill}$ received by an imager (or valve) 4.

The imager 4 determines which parts of the binary beam $B_{ill}$ must be transmitted to an imaging system, so creating a secondary light beam $B_{img}$ which represents the image to be displayed.

The imager 4 is, for example, produced in the form of an array of pixels. Each pixel acts on the incident ray (part of the primary beam $B_{ill}$) according to the intensity with which the corresponding pixel in the image to be displayed must be lit.

The light from the imager is projected by an imaging system 6 towards a display screen 10.

In the example represented in FIG. 1, the incident rays on the screen 10 have an angle of incidence that varies from an angle $\theta_1$ (approximately 10°) in its bottom part to an angle $\theta_2$ (approximately 60°) in its top part.

The screen 10 of FIG. 1 is of a design similar to that described in detail below and represented in FIG. 2, but, of course, includes on the Fresnel lens only the region designed to receive incident rays with an angle ranging from $\theta_1$ to $\theta_2$.

Figure 2:
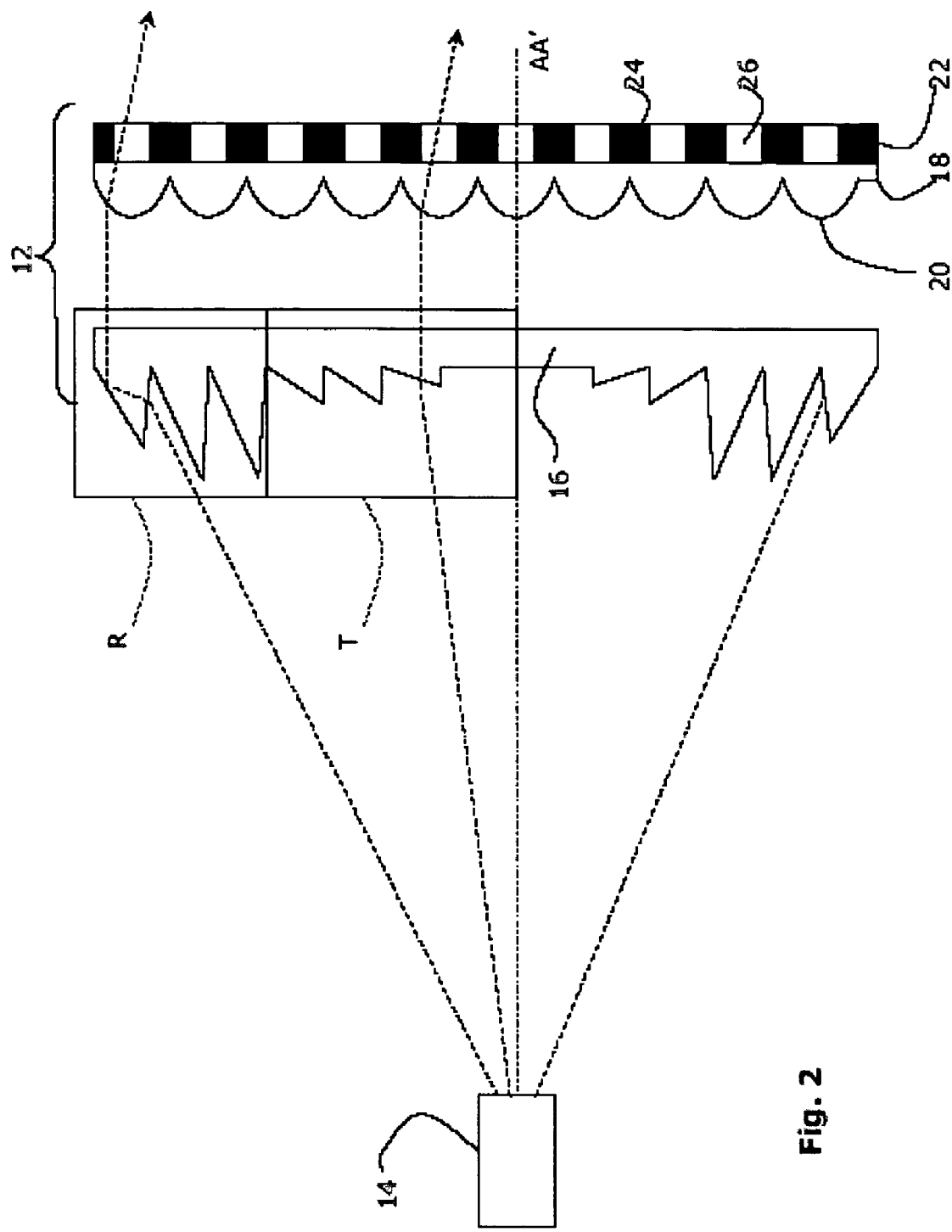
FIG. 2 represents an optical engine and a screen produced in accordance with the teachings of the invention.

FIG. 2 indeed represents a screen 12 which receives from an optical engine 14 a beam defining an image to be displayed. The optical engine 14 comprises elements equivalent to the lighting system 2, the imager 4 and the imaging system 6 of FIG. 1.

The screen 12 comprises a Fresnel lens 16 which globally collimates the beam received from the optical engine 14, a plate 18 supporting optical elements 20 and a dark matrix 22.

The dark matrix 22 comprises alternating dark regions 24 and transparent regions 26. The optical elements 20 of the plate 18 are used in particular to focus each part of the incident light beam on the plate 18 in a transparent region 26 of the dark matrix 22. The use of the dark matrix 22 increases the contrast of the display device.

The optical elements 20 are also used to diffuse the light beam in a solid angle about the main axis AA' of the screen 12 (axis perpendicular to the screen) in order for the display on the screen to be produced correctly even if the observer is not located precisely on the axis.

Of course, the number of optical elements 20 and regions 24, 26 is limited in FIG. 2 in order not to compromise the clarity of the explanation. In reality, the number of such elements is naturally far greater, numbering several elements for each pixel in the image to be displayed.

As mentioned previously, the Fresnel lens 16 is used generally to collimate the beam received from the optical engine 14 in order to obtain a correct processing of the beam by the optical elements 20.

The Fresnel lens 16 has symmetry of revolution about the main axis of the system AA'. The Fresnel lens 16 includes, in a first region 18 shown in detail in FIG. 3, prisms that work in reflection mode and, in a second region T shown in detail in FIG. 4, prisms that work in refraction mode.

In a first area Z1 of the first region R (FIG. 3), the prisms 28, 40 are produced conventionally, that is, they comprise a first side 30 that is strongly inclined (i.e., that forms a small angle with the main axis) that produces a refraction of the incident rays and a second side 32 that collimates the incident ray R1 by reflection into a ray R1' parallel to the main axis AA'.

In a second area Z2 of the first region R, the prism 34 is slightly modified compared to the conventional design. In practice, it also comprises a first side 36 that is strongly inclined (which forms an angle of about 20° with the main axis, normally less than 30°) and a second side 38 that reflects the incident ray R2 towards the front, that is, towards the plate 18.

The first and second sides 36, 38 are not, however, exactly oriented in such a way as to collimate the ray R2, but their orientation is slightly modified so as to improve overall transmission mode efficiency of the prism 34, for example by reducing the losses generated by the lost rays $R_p$ (rays that enter via the first side 30, 36 but do not intercept the second side 32, 38).

The angle at the peak of the prism 34 is normally limited by the etching tool, and modifying the sides 36, 38 of the prism 34 compared to the conventional design may therefore be advantageously performed by inclining by the same amount the sides 36, 38, so retaining a constant angle at the peak.

Improving the effectiveness in this way thus requires a decollimation of the output beam and the ray R2' reflected by the second side 38 will therefore form a non-zero angle α with the main axis AA'.

With a first side 36 oriented in both cases such that the angle at the peak is the limit angle possible for the etching tool, the difference Δβ between the incline β of the second side 38 and the incline $β_0$ that would have allowed a collimation of the ray R2 must, however, be limited in order not to compromise the optical operation of the system. The values of Δβ will preferably be taken to be a few degrees, normally less than 5°.

In practice, the ray R2' reflected by the second side 38 of the prism 34 forms a non-zero angle α with the main axis AA'. With the values of Δβ used in preference (see above), the result is normally an angle less than 10°. In some cases, for example when the optical tolerances are low, the second side 38 will be oriented so as to obtain an angle α less than 5°.

Preferably, the orientation (β) of the second side 38 is modified compared to the conventional orientation ($β_0$) in a not inconsiderable way so as to obtain a substantial improvement in the efficiency of the prism 34. This not inconsiderable modification results, for example, in a minimum decollimation (α) of 1°, even a minimum decollimation (α) of 2°.

It can be seen that, through the use in the present case of an incline β greater than the conventional incline $β_0$ enabling collimation, the reflected ray R2' is divergent from the main axis AA'.

Figure 3:
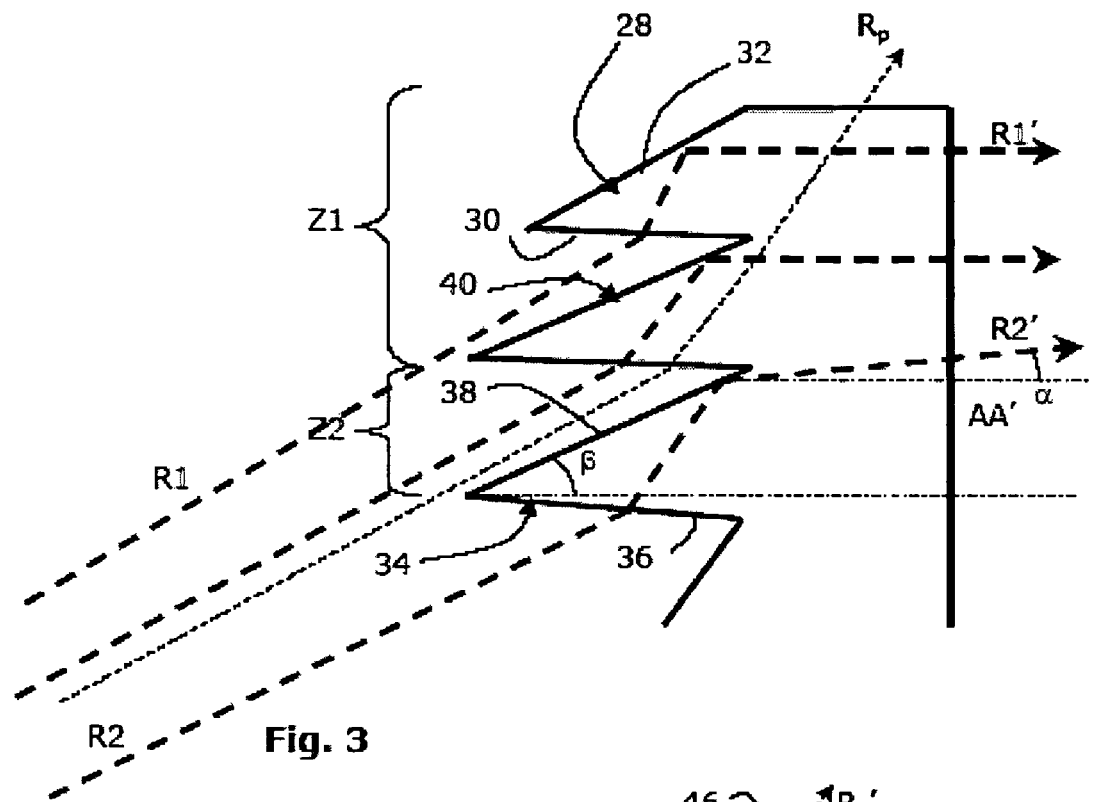
FIG. 3 represents in detail the prisms of FIG. 2 working in reflection mode.

According to one possible embodiment, the second side 38 of the prism 34 is essentially parallel to the corresponding side of a prism 40 of the first area Z1. As can be seen in FIG. 3, the prism 34 of the second area Z2 and the prism 40 of the first area Z1 are adjacent.

Naturally, it could be possible to provide a different number of prisms for each area Z1, Z2; thus, the first area Z1 could contain just one single prism 28 or a number of prisms 28 greater than two and the second area Z2 could contain several prisms.

In a first area Z3 of the second region T (FIG. 4), the prisms 41 are produced conventionally: they comprise a first side 42 that is virtually in line with the main axis AA' (generally at 3° for fabrication rays) and a second side 44, the orientation of which is such that the incident ray R3 is collimated by refraction, that is, that the ray transmitted R3' by the prism 41 is parallel to the main axis AA'.

In a second area Z4 of the second region T, the or each prism 46 is slightly modified compared to the conventional design: whereas a first side 48 of the prism 46 is located essentially in line with the main axis AA' conventionally, a second side 50 of the prism 46 is slightly inclined compared to the conventional design so that the incident ray R4 is not transmitted exactly parallel to the main axis AA', but in a slightly different direction R4', and this in order to improve the overall efficiency of the prism 46.

The angle δ between the second side 50 of the prism 46 and the main axis AA' (naturally defined in a plane passing through the main axis AA') therefore differs from the angle $δ_0$ between the main axis and a side that would have allowed a collimation of the ray R4 (that is, a refraction of the ray R4 into a ray parallel to the main axis AA') by a value Δδ.

The ray R4' transmitted by refraction by the prism 46 therefore forms a non-zero angle γ with the main axis AA'.

As has been seen previously, the angle γ between the ray R4' and the main axis AA' (which therefore represents the decollimation quantity) is preferably greater than 1°, even 2°, so as to obtain a substantial efficiency improvement effect.

Similarly, the angle γ is preferably less than 10°, or even if necessary less than 5°, in order to avoid degrading the optical properties of the system.

Figure 4:
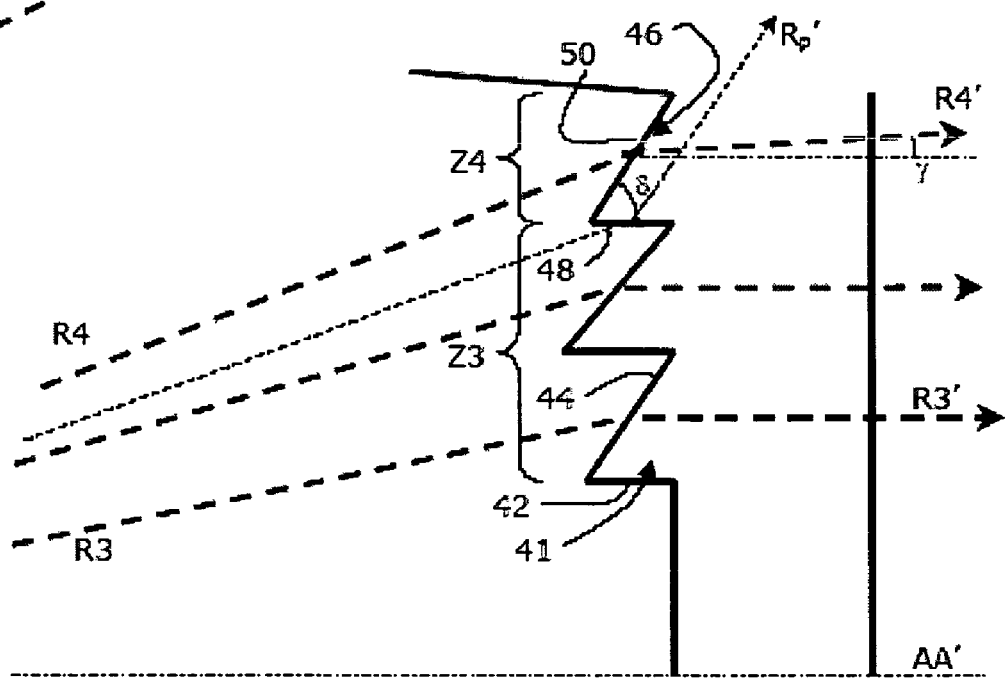
FIG. 4 represents in detail the prisms of FIG. 2 working in refraction mode.

In the advantageous example represented in FIG. 4, the angle δ which defines the orientation of the second side 50 of the prism 46 in the second area Z4 relative to the main axis AA' is chosen to be greater than the angle $δ_0$ which would have allowed a collimation of the ray R4 at this point according to the conventional design. The angle of incidence of the ray R4 on the second side 50 is therefore less than it would have been in a conventional design and the efficiency of the prism 46 is improved, on the one hand by the reduction in the Fresnel losses associated with refraction, but mainly through the reduction in the losses introduced by the first side 48, the size of which is thus reduced (lost rays $R_p$').

In this case, the ray R4' transmitted by the prism 46 is therefore divergent from the main axis AA'.

It is possible, for example, to define the second side 50 of the prism 46 of the second area Z4 to be essentially parallel to the second side 44 of the prism 41 of the first area Z3 that is adjacent to it.

The Fresnel lens 16 as proposed by the invention and described in detail above with reference to FIGS. 3 and 4 is particularly interesting in the context of projection display devices such as those described with reference to FIGS. 1 and 2.

In practice, the optical system located downstream of the Fresnel lens 16, namely, generally, the plate 18 of optical elements 20 and the dark matrix 22, allows a decollimation of the incident beam of around 5° to 10°.

The invention that has just been described is, of course, not limited to the embodiments described.

In particular, for the transmission of the beams, according to the invention, the Fresnel lens can comprise in particular two, three or four areas, the areas being distinguished by the manner in which the light received by the second sides of the prisms is transmitted according to two parameters:

the first parameter is associated with the transmission mode which can be reflective (the second side of the corresponding prisms being designed to reflect the light received from the source) or refractive (the second side of the corresponding prisms being designed to refract the light received from the source); and the second parameter concerns the direction of transmission of the light received, which is either in line with the main axis of the lens, or in a different direction.

According to the invention, these two parameters can be combined in all possible ways, by respecting the condition that at least one of the areas transmits the light received in the direction of the main axis and at least one of the areas transmits the light received in a different direction.

Thus, in a lens with two areas, it is possible to have two transmissive or reflective type transmission modes or two areas with different transmission modes.

In a lens with three areas, it is possible to have two areas according to a first mode and one area according to a second different mode; it is also possible to have either one area or two areas, in which the second side of the prisms transmits the light received in the direction of the main axis.

Preferably, in a lens with areas in which the prisms work with a different transmission mode, the or each area where the prisms work in a refractive mode are nearest to the main axis of the lens.

As an illustration, in a lens, the limits of the areas preferably observe the following characteristics:

an area with prisms working in a refractive mode and with a transmission along the main axis of the lens, the angle of incidence of the incident rays is less than approximately 20°;

an area with prisms working in a reflective mode and with a transmission along the main axis of the lens, the angle of incidence of the incident rays is greater than approximately 40°;

in a lens with two areas with a transmission in a direction that is different from the main axis of the lens, the angle of incidence of the incident rays is equal to approximately 30° at the limit between these two areas.

Thus, a particular embodiment can, for example, comprise the following combinations of areas Z1 to Z4 (as illustrated in FIGS. 3 and 4) (the first element of the sequences as represented below being the nearest to the axis of the lens): (Z3, Z4), (Z3, Z2), (Z4, Z1), (Z2, Z1), (Z3, Z4, Z2), (Z3, Z4, Z1), (Z4, Z2, Z1) or (Z3, Z4, Z2, Z1).

Moreover, preferably, the angle at the peak of the prisms in the lens is constant in order to facilitate fabrication and, for example, equal to 40° or, more generally, between 35° and 45°.

In order to determine the orientation of the beam transmitted by a prism, it is possible to use conventional means, such as the use of an average ray as in FIGS. 3 or 4 or a measurement of the average of the orientations of the rays transmitted by the prism.

The invention claimed is:

1. A projection display device comprising:
    means of generating an image;
    means of projecting the image onto a screen;
    the screen comprising a Fresnel lens having a symmetry of revolution about a main axis,
    said Fresnel lens including at least one first area comprising first prisms, each first prism having a first side and a second side which forms with the main axis, an angle greater than that formed by the first side and the main axis,
    the second side of the first prism being designed to collimate, in line with the main axis; an incident ray from said projection means,
    wherein said Fresnel lens includes one second area comprising second prisms, each second prism having a first side and a second side which forms with a main axis an angle greater than that formed by the first side and the main axis,
    the second side of the second prism being designed to transmit, in a first direction different from the main axis, an incident ray from said projection means
    wherein, in at least one of said first and second areas, the first and second prisms work in a reflective mode, the first side of each of the first and second prisms refracting incident ray from said projection means to the second side of the corresponding which reflects the refracted ray to the output of said Fresnel lens, and
    wherein said Fresnel lens comprises at least one third area comprising third prisms, each third prism having a first side and a second side which forms with a main axis an angle greater than that formed by the first side and the main axis, and being designed to transmit an incident ray from said projection means in line with said main axis, the third prisms working in a reflective or transmissive mode different from the working mode of the first prisms.

2. The device as claimed in claim 1 wherein the first area is adjacent to the second area.

3. The device as claimed in claim 1 wherein the first direction is divergent from the main axis, 4. The device as claimed in claim 1, wherein the first direction and the main axis form between them an angle greater than 1°.

5. The device as claimed in claim 4, wherein the first direction and the main axis form between them an angle greater than 2°.

6. The device as claimed in claim 1, wherein the first direction and the main axis from between them an angle less than 10°.

7. The device as claimed in claim 6, wherein the first direction and the main axis form between them an angle less than 5°.

8. The device as claimed in claim 1, wherein, in at least one of said first and second areas, the first and second prisms work in a refractive mode, the second side of each of the first and second prisms refracting an incident ray from said projection means, to the output of said Fresnel lens.

9. The device as claimed in claim 1, wherein, in at least one of said first areas, the first prisms work in a refractive or reflective mode different from the mode in which the second prisms in at least one of said second areas work.

10. The device as claimed in claim 1, wherein said Fresnel lens comprises at least one fourth area comprising fourth prisms, each fourth prism having a first side and a second side which forms with a main axis an angle greater than that formed by the first side and the main axis, and being designed to transmit an incident ray from said projection means in a direction that is different from the main axis, the fourth prisms working in a reflective or transmissive mode different from the working mode of the second prisms.

11. The device as claimed in claim 1, wherein the Fresnel screen comprises diffusion means.

* * * * *